United States Patent [19]
Yi et al.

[11] Patent Number: 6,055,342
[45] Date of Patent: Apr. 25, 2000

[54] INTEGRATED OPTICAL INTENSITY MODULATOR AND METHOD FOR FABRICATING THE SAME

[75] Inventors: Sang-yun Yi; Woo-hyuk Jang, both of Yongin, Rep. of Korea

[73] Assignee: Samsung Electronics Co., Ltd., Kyungki-do, Rep. of Korea

[21] Appl. No.: 09/110,944

[22] Filed: Jul. 7, 1998

[30] Foreign Application Priority Data

Jul. 14, 1997 [KR] Rep. of Korea .................. 97-32683

[51] Int. Cl.⁷ .................................................. G02F 1/035
[52] U.S. Cl. ...................... 385/2; 385/4; 385/8; 385/15
[58] Field of Search ........................................ 385/2–16

[56] References Cited

U.S. PATENT DOCUMENTS 5,852,688  12/1998  Brinkman et al. ........................ 385/16

*Primary Examiner*—Phan T. H. Palmer
*Attorney, Agent, or Firm*—Leydig, Voit & Mayer, Ltd.

[57] ABSTRACT

An integrated optical intensity modulator and a method for fabricating it. The integrated optical intensity modulator includes a substrate having spontaneous polarization, cut in an axial direction; an optical waveguide on the substrate; domain-inversion areas having domains reverse from the direction of spontaneous polarization, arranged in a staggered pattern around the optical waveguide; a first electrode on the optical waveguide on a surface of the substrate, and second and third electrodes on the substrate on opposite sides of and on the same surface as the first electrode. When a voltage is applied to the first electrode, a light wave is deflected and scattered in a domain-inversion area in accordance with a change of the refractive index of the domain-inversion area in the optical waveguide and the refractive index of the spontaneous polarization area. Since the domain-inversion structure of the ferroelectric substrate has a staggered pattern around the optical waveguide, and an optical guided mode is deflected by an applied voltage, only half the driving voltage of prior art structures is required for the optical waveguide. Deflecting the optical guided mode to the right and to the left alternatively, in multiple stages, increases the extinction ratio.

11 Claims, 9 Drawing Sheets

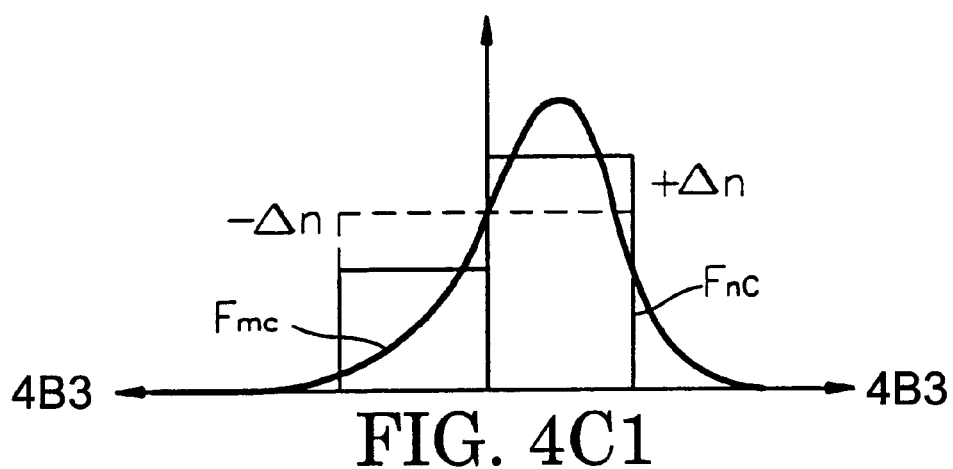
FIG. 4C1
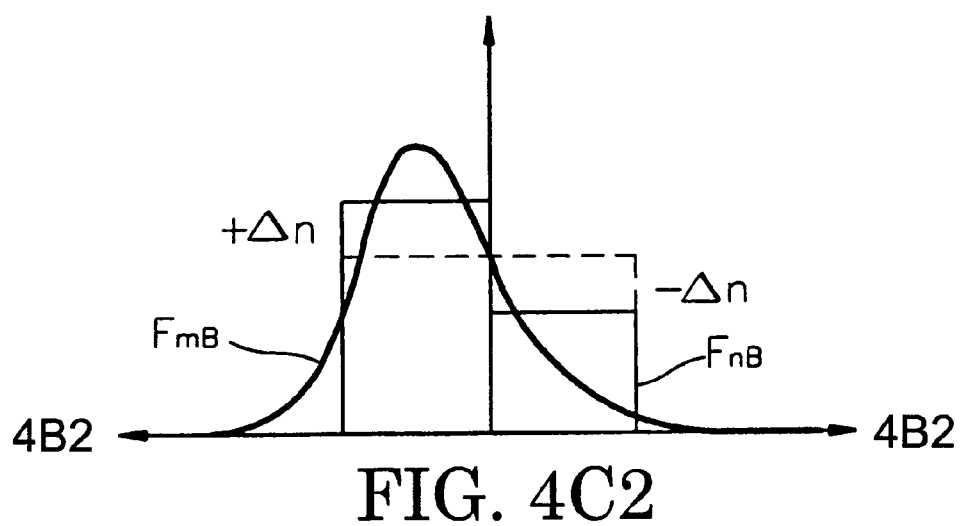
FIG. 4C2
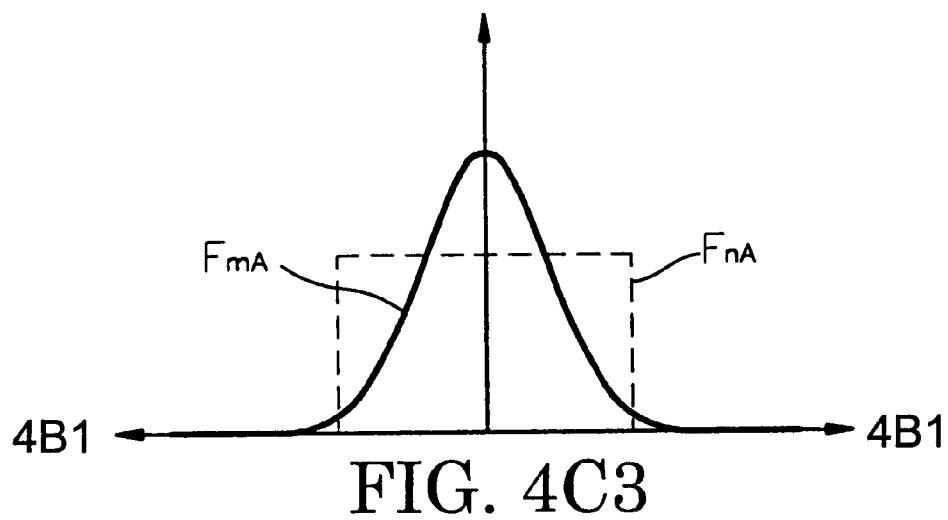
FIG. 4C3

INTEGRATED OPTICAL INTENSITY MODULATOR AND METHOD FOR FABRICATING THE SAME

BACKGROUND OF THE INVENTION

1. Field of the Invention

The present invention relates to an optical intensity modulator and a method for fabricating the same, and more particularly, to an integrated optical intensity modulator having an optical waveguide in which an area of discontinuous refractivity having a staggered pattern is induced by applying a voltage, and to a method for fabricating the same.

2. Description of the Related Art

Integrated optics is a technology for fabricating various optical devices based on an optical waveguide, on a substrate. This can simplify arrangement of optical devices and manufacture of devices having many functional devices in a small area, reducing production costs. Also, electrodes are formed around the optical waveguide and thus an electric field is produced only in an optical waveguide area, to control the passage of light waves with a low driving voltage. A typical material of the integrated optical substrate is a ferroelectric such as $LiNbO_3$ or $LiTaO_3$, or an electro-optic polymer.

The optical intensity modulator is a device for switching on and off a light wave transmitted along the optical waveguide, using a voltage, and is used as a main element of an optical communication system and an optical sensing system. The optical intensity modulator can be one of two types, one of which uses phase modulation, e.g., a Mach-zehnder interferometric modulator or a directional coupler switch, and the other of which modulates the refractive index by abruptly changing it, e.g., a cutoff modulator.

The structure of the cutoff modulator is simple enough to be fabricated cheaply, and thus it can be tuned to be suitable for various applications. The cutoff modulator can be used, for example, for realizing a linear optical modulator which has no direct current (DC) bias and a DC-drift effect which may occur in setting an operation point of an optical modulator with a DC voltage.

FIG. 1A is a perspective view of a conventional optical intensity modulator. The optical intensity modulator of FIG. 1A includes a $LiNbO_3$ substrate in which crystal is cut in the Z direction (Z-cut) or a Z-cut $LiTaO_3$ substrate 100, a channel optical waveguide 102 manufactured on the substrate 100 by an annealed proton exchange method, and electrodes 104 capable of applying an electric field to the optical waveguide 102 and the substrate 100. At this time, a buffer layer 106 such as $SiO_2$ is formed on the optical waveguide to suppress ohmic loss of a light wave passing through the optical waveguide caused by the electrode, and then an electrode formed of Cr and Au is formed. If a voltage $V_a$ is applied to the electrode to apply an electric field to the optical waveguide in the +Z direction, a change $\Delta n$ of the refractive index is as follows.

$$\Delta n = \frac{-1}{2} n^3 r_{33} E_z \qquad (1)$$

where n denotes the refractive index, $r_{33}$ denotes an electro-optical coefficient and $E_z$ denotes a Z-direction component of an applied electric field. According to Formula 1, if the electric field is applied in the +Z direction, the refractive index is reduced, and if in the −Z direction, it is increased. Thus, if the electric field in the +Z direction is applied to the optical modulator of FIG. 1A, the refractive index of the optical waveguide is reduced as shown in FIG. 1C, and if the light wave enters the modulation area as shown in FIG. 1B, scattering loss occurs due to mode-shape mismatching. Reference numeral 108 of FIGS. 1A and 1B denotes a modulation area. Reference numerals of FIGS. 1B and 1C common to FIG. 1A represent the same elements. Here, the amount of scattering loss is determined by a difference between a guided mode distribution $f_1$ of an optical waveguide input portion and a guided mode distribution $f_2$ of a modulation area. If guided mode power of the optical waveguide input portion is $P_1$, guided mode power of the modulation area is $P_2$, and a cross-sectional area of the optical waveguide is s, scattering loss due to mode-shape transition is as follows.

$$I_{21} = \frac{P_2}{P_1} = \frac{\int (f_1 f_2^*) ds}{\int (f_1 f_1^*) ds \cdot \int (f_2 f_2^*) ds} \qquad (2)$$

Here, * indicates a complex conjugate. The modulation depth of the optical intensity modulator can be obtained using Formula 2. In order to obtain the maximum modulation depth, $I_{21}$ becomes zero in applying a voltage, and thus a mode distribution $f_2$ of the modulation area must be scattered on the entire surface of the substrate. That is, the optical waveguide must be cut off. In order to make waveguide cutoff easy when an electric field is applied to the waveguide, it is common to set initial guiding conditions of the optical waveguide to near the cutoff condition. However, if the guiding conditions of the optical waveguide are set to near the cutoff condition, the insertion loss of the optical modulator is increased.

Guided mode distribution in the modulation area is similar to that of the input portion of the optical waveguide, requiring a high driving voltage. That is, the guided mode distribution of the modulation area, like that of the guided mode distribution of the input portion of the optical waveguide, is symmetrical around a center point of the optical waveguide, and peak points of the mode distributions coin_cide, making it difficult to effectively reduce the $I_{21}$ value of Formula 2. Thus, a high voltage must be applied to obtain a required extinction ratio of approximately 20 dB or higher.

SUMMARY OF THE INVENTION

To solve the above problems, it is an objective of the present invention to provide an integrated optical intensity modulator in which the refractive index of an optical waveguide is discontinuous and has a staggered pattern and the light wave distribution mode is asymmetrical with respect to the center of the waveguide, to modulate a light wave with low insertion loss and a low driving voltage.

It is another object of the present invention to provide a method for fabricating the integrated optical intensity modulator.

Accordingly, to achieve the above objective, there is provided an integrated optical intensity modulator comprising: a substrate having spontaneous polarization, cut in a predetermined direction; an optical waveguide formed on the substrate; a plurality of domain-inversion areas having domains in the reverse direction of the spontaneous polarization, arranged in a staggered pattern around the optical waveguide; and a first electrode formed on the optical waveguide and second and third electrodes formed on the substrates on the right and left of the optical waveguide, wherein if a predetermined voltage is applied to the electrode, light wave is deflected and scattered in a domain-inversion area in accordance with a change of the refractive index of the domain-inversion area in the optical waveguide and the refractive index of the spontaneous polarization area.

To achieve the second objective, there is provided a method for fabricating an integrated optical intensity modulator, comprising the steps of: (a) forming a domain-inversion electrode arranged in a staggered pattern around a longitudinal axis of the electro-optical substrate; (b) applying a predetermined pulse voltage to the domain-inversion electrode formed in step (a), to form a domain-inversion area, and then etching the domain-inversion electrode; (c) masking a portion of the resultant structure of step (b) where no optical waveguide is to be formed, and dipping the masked portion into a predetermined proton source solution for a predetermined time to thus exchange protons of the proton source solution with a predetermined ion existing on the substrate, to form a proton exchange area; (d) annealing the resultant structure of step (c) for a predetermined time to form an optical waveguide; and (e) forming a predetermined electrode on the optical waveguide and on the substrate on the right and left of the optical waveguide formed in step (d).

BRIEF DESCRIPTION OF THE DRAWINGS

The above objectives and advantages of the present invention will become more apparent by describing in detail a preferred embodiment thereof with reference to the arched drawings in which:

FIGS. 4B1, 4B2, and 4B3 are cross-sections of the optical modulator of FIG. 4A, respectively taken along lines 4B1—4B1, 4B2—4B2, and 4B3—4B of FIG. 4A;

FIGS. 4C1, 4C2, and 4C3 are a refractive index and distribution of a guided mode respectively taken along lines 4B1—4B1, 4B2—4B2, and 4B3—4B3 of FIG. 4A when an electric field is applied to the optical modulator.

DESCRIPTION OF THE PREFERRED EMBODIMENTS

Figure 1A:
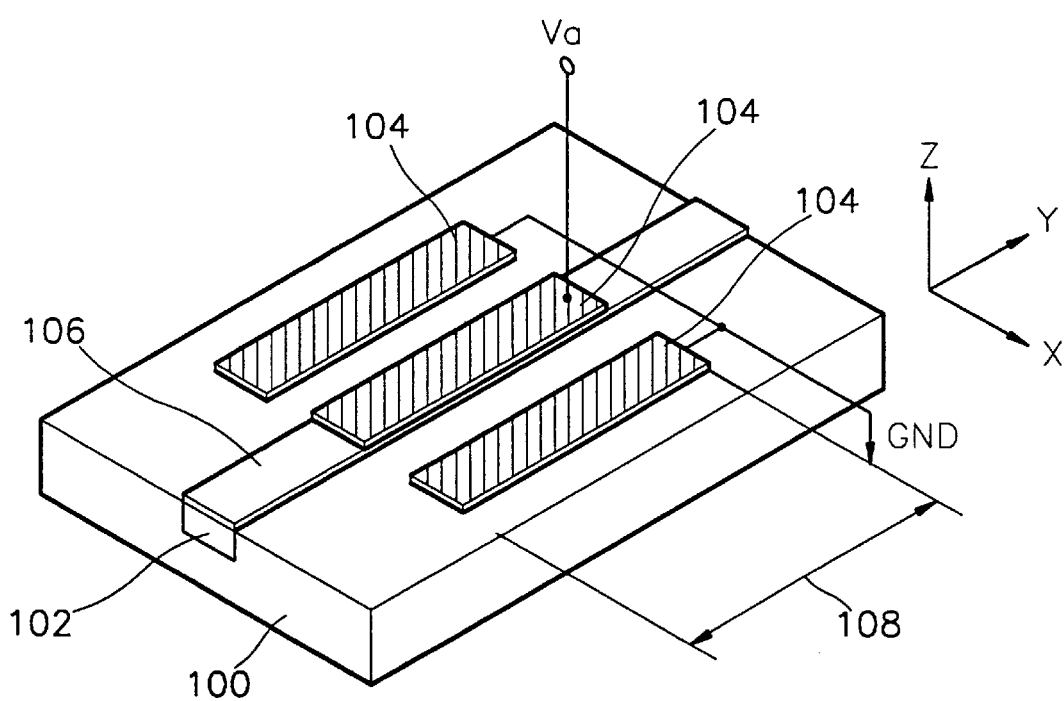
FIG. 1A shows a conventional optical intensity modulator.
Figure 1B:
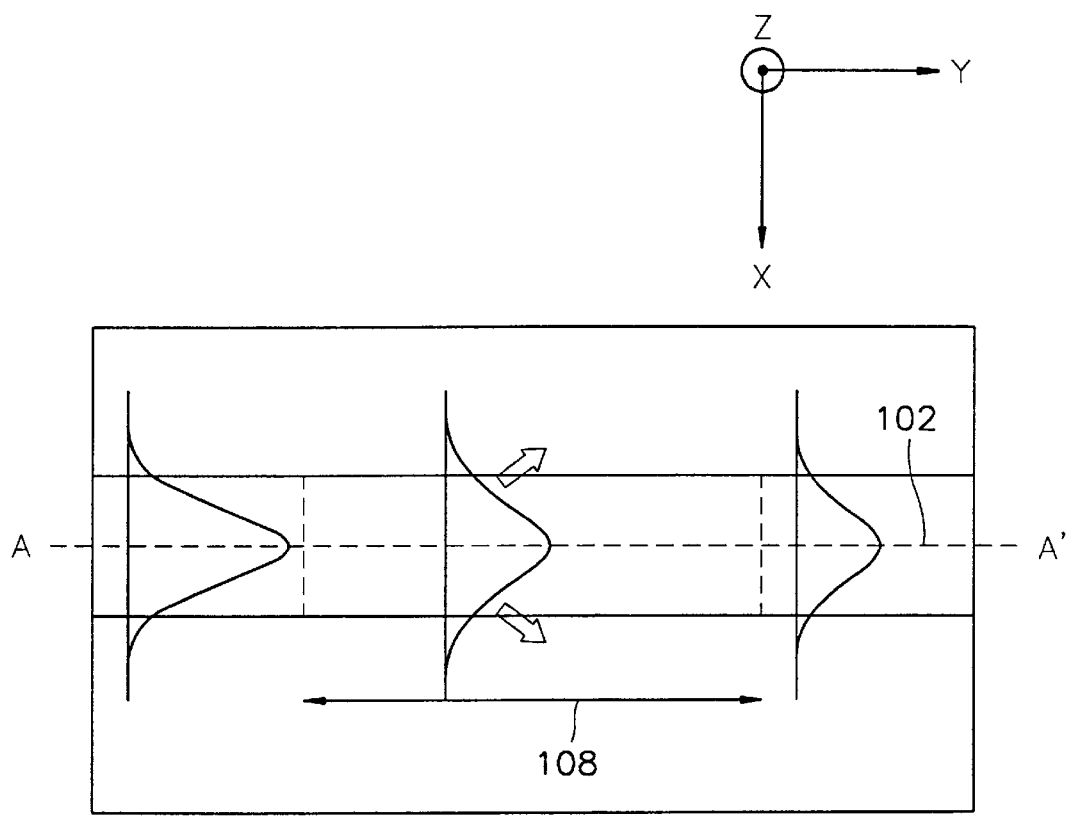
FIG. 1B shows a process of scattering of light wave due to guided mode transition in the conventional optical intensity modulator of FIG. 1A.
Figure 1C:
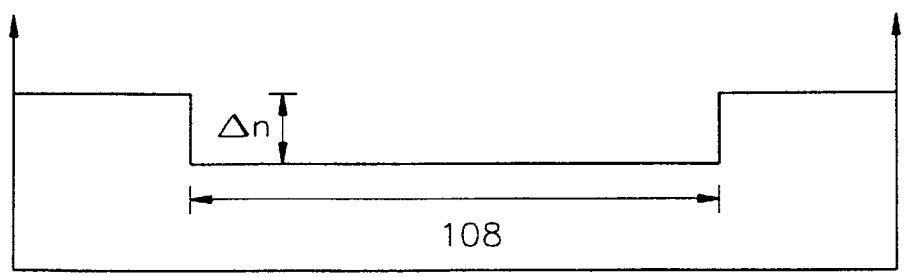
FIG. 1C shows a change in refractive index of the conventional optical intensity modulator of FIG. 1A along AA' of FIG. 1B.
Figure 2:
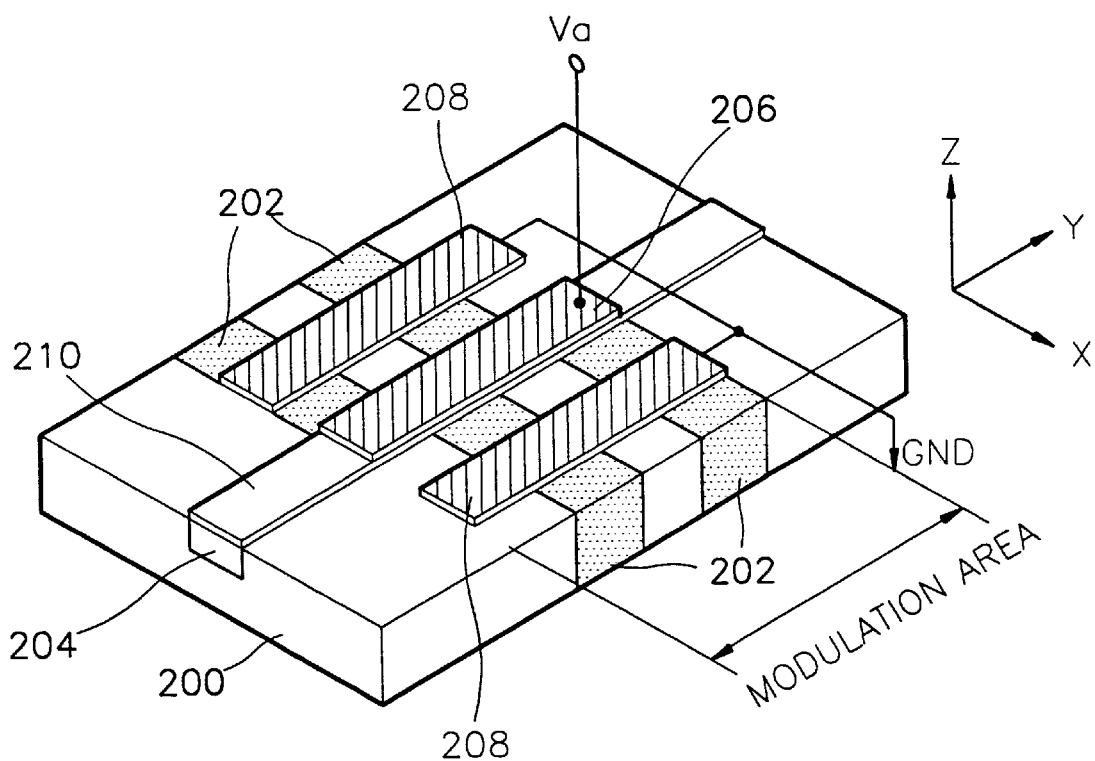
FIG. 2 shows an integrated optical intensity modulator according to the present invention.

Referring to FIG. 2, in an optical modulator, an optical waveguide 204 among domain-inversion areas 202 of a $LiNbO_3$ or $LiTaO_3$ substrate 200, includes an electrode 206 and a ground 208 to apply an electric field to the optical waveguide 204. A buffer layer 210 of $SiO_2$ is disposed on the optical waveguide 204.

Figure 3A:
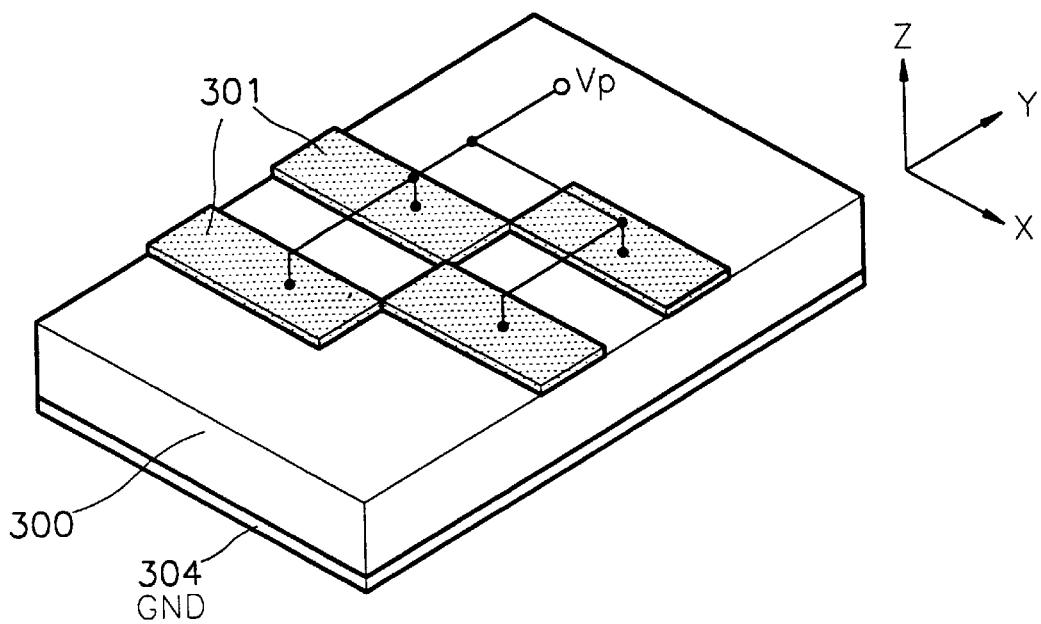
FIGS. 3A through 3E are sectional views showing a process of forming the optical intensity modulator of FIG. 2.
Figure 3B:
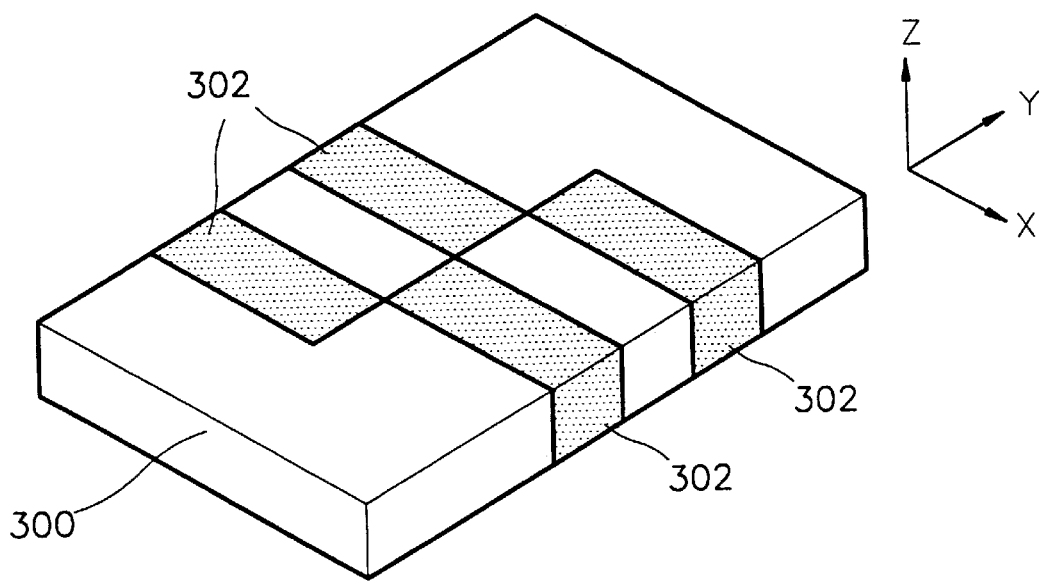

Referring to FIGS. 3A through 3E, substrates for modulating the optical intensity are a single crystal electro-optic material such as $LiNbO_3$ or $LiTaO_3$, and have spontaneous polarization. In the process of forming a domain-inversion electrode of FIG. 3A, Cr and Au are sequentially deposited on the Z-cut substrate 300 in a staggered pattern, at a predetermined spacing, to form a domain-inversion electrode 301. Cr and Au are subsequently deposited on the bottom of the substrate 300 to form a ground electrode 304. All electrodes of the upper surface of the substrate 300 are electrically connected, and then a positive voltage higher than a coercive field of the crystal is applied to form the domain-inversion area. When the electric field is applied to the electrode, a pulse voltage $V_p$ having a pulse width of tens of microseconds or less is applied to prevent crystals from being damaged due to electron breakdown. In the step of FIG. 3B, the domain-inversion electrode 301 is removed by chemical etching after the domain-inversion. Reference numeral 300 of FIG. 3B denotes a substrate, and reference numeral 302 denotes a domain-inversion area formed by the above-described process.

Figure 3C:
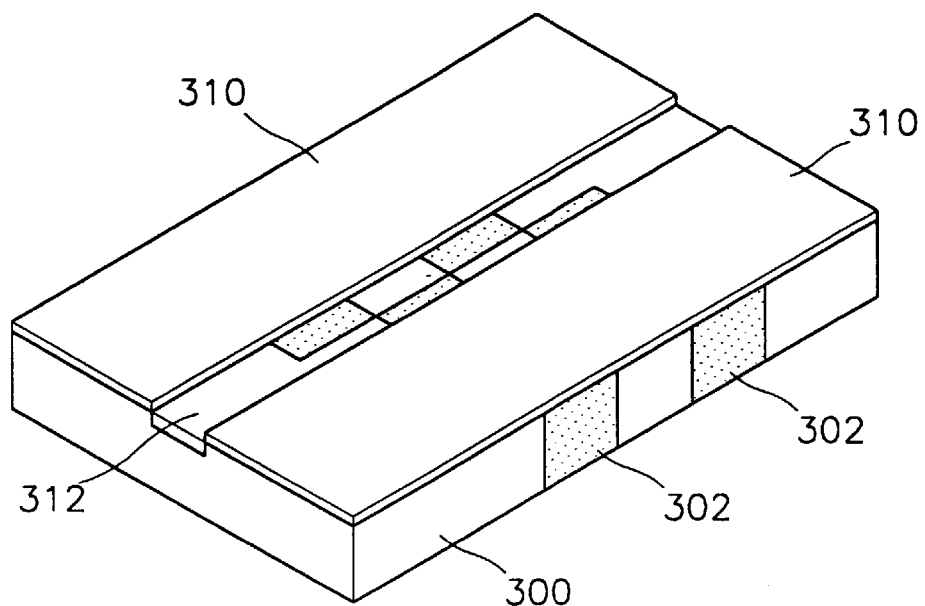

FIG. 3C shows the step of depositing a Cr thin film 310 on portions of the substrate of FIG. 3B in which a channel optical waveguide is not to be formed. The deposition of the Cr thin film 310 is patterned such that a portion where the domain-inversion area is divided is at the center of the optical waveguide. After deposition, the resultant structure of FIG. 3C is dipped into a proton source solution, such as benzoic acid at 150~260° C., for several minutes to several hours, and then protons $H^+$ in the benzoic acid are exchanged with $Li^+$ of the portion where the optical waveguide is to be formed, to form a proton exchange area 312.

Figure 3D:
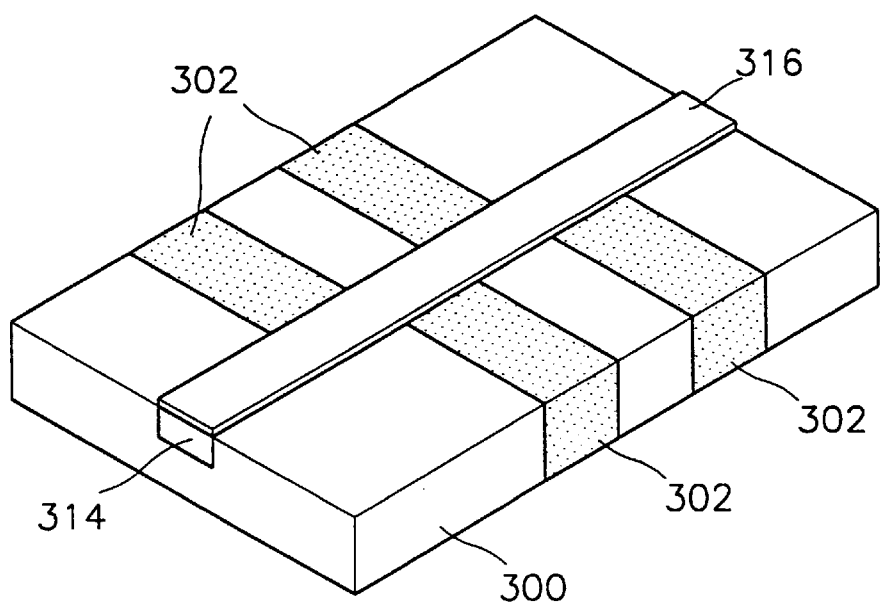

The process of FIG. 3D is annealing after proton exchange. The substrate where the proton exchange area 312 is formed is annealed at approximately 350° C. for several minutes to several hours. The annealing reduces propagation loss of the optical waveguide 314 and recovers the electro-optic coefficient. At this time, a $SiO_2$ thin film 316 is formed on the optical waveguide by a self-alignment method before the annealing, in order to enhance the guidance of the optical waveguide and to control a guided mode shape. Protons concentrated on the surface diffuse, during annealing, into the substrate, to reduce surface refractive index and deepen the optical waveguide.

Figure 3E:
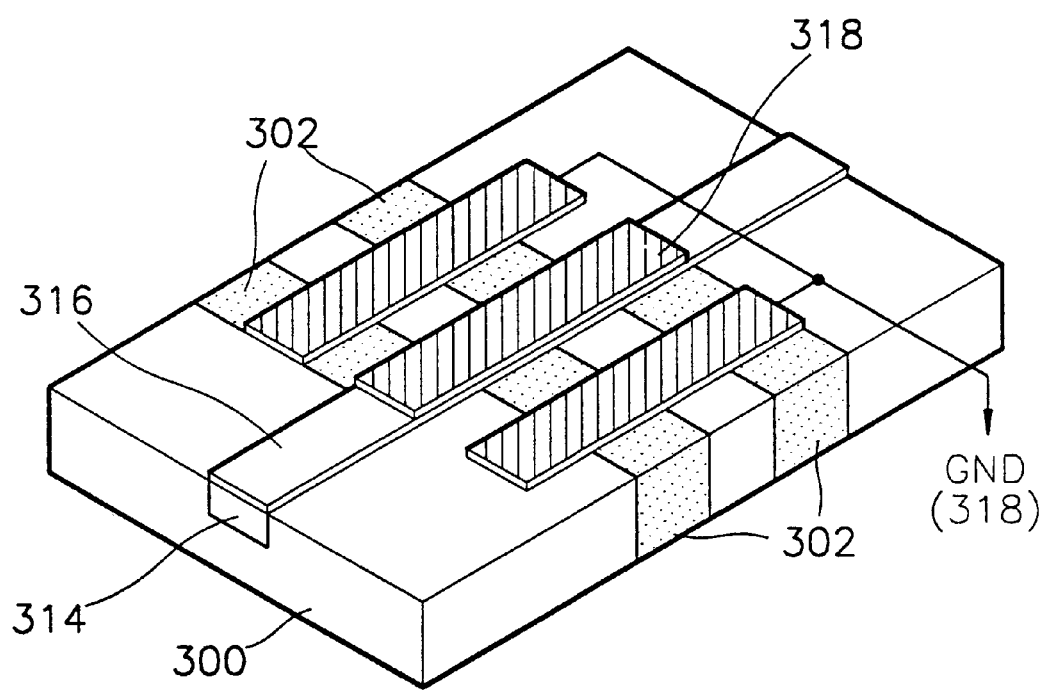

FIG. 3E shows the step of forming an electrode for optical intensity modulation, after annealing. The electrode 318 is formed as shown in FIG. 3E, and the $SiO_2$ thin film 316 functions as a buffer layer of the electrode on the optical waveguide, so that the electrode 318 for applying a driving voltage can be formed on the resultant structure without etching the $SiO_2$ thin film 316. The electrode is formed such that a Z-direction component of an applied electric field is positioned symmetrically around the center of the optical waveguide, and Cr and Au are sequentially deposited to increase conductivity and adhesion of the electrode.

Figure 4A:
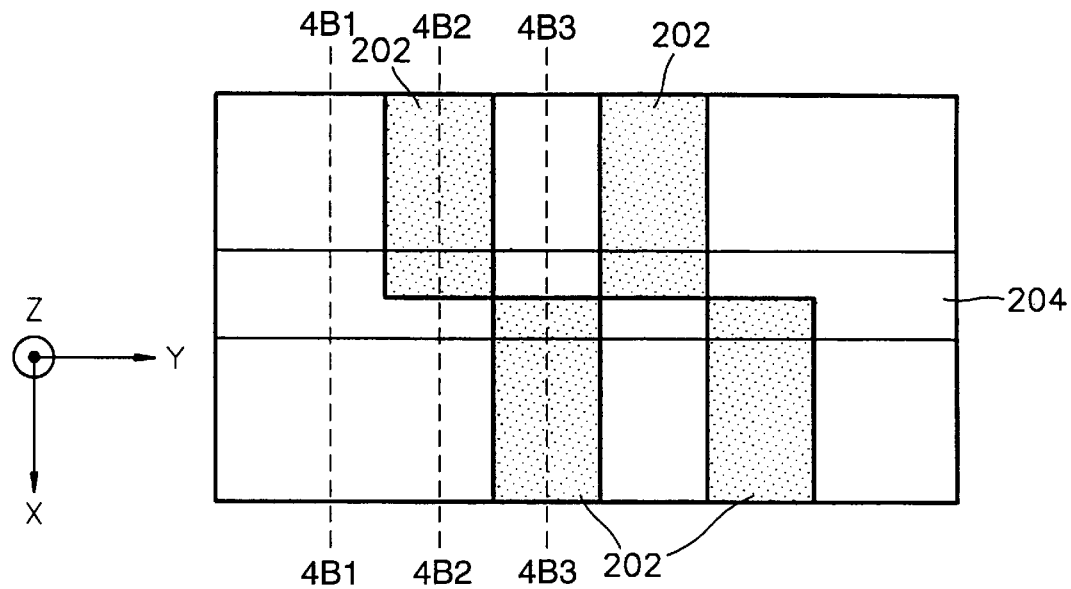
FIG. 4A is a plan view of the integrated optical intensity modulator of FIG. 2.
Figure 4A:
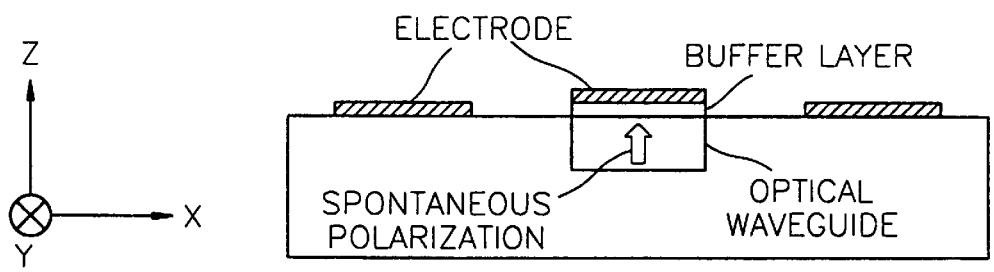
Figure 4A:
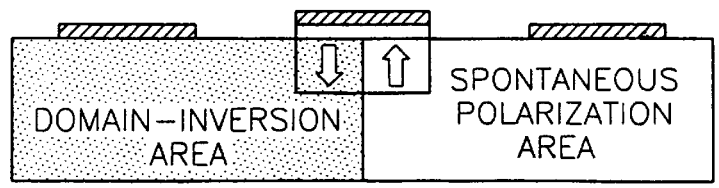
Figure 4A:
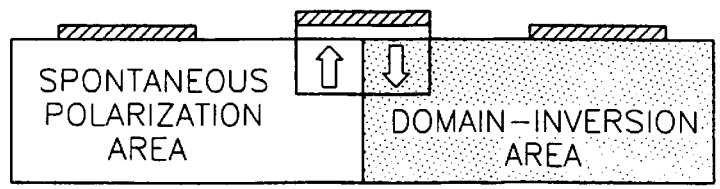

Meanwhile, a principle of scattering light waves in the optical waveguide of FIG. 2 will be described with reference to FIGS. 4A through 4D. In FIG. 4A, reference numerals 202 and 204 are the same as those of FIG. 2. FIGS. 4B1, 4B2, and 4B3 show cross-sections of the optical modulator of FIG. 2, along lines 4B1—4B1, 4B2—4B2, and 4B3—4B3 of FIG. 4A. A +Z-axis direction arrow in the optical waveguide of FIG. 4B2 denotes the direction of the spontaneous polarization of a crystal, and a -Z-axis direction arrow denotes an inverted domain direction of a crystal in the domain-inversion area. If the polarization is inverted, the sign of the electro-optical coefficient is also changed.

FIGS. 4C1, 4C2, and 4C3 show distributions of a local normal guided mode of the optical waveguide of FIGS. 4B1, 4B2, and 4B3 when the electric field is applied to the optical modulator. $F_{nA}$, $F_{nB}$ and $F_{nC}$ of FIGS. 4C3, 4C2, and 4C1 represent the refractive index distribution in the X-axis direction of the optical waveguide, and $F_{mA}$, $F_{mB}$ and $F_{mC}$ represent guided mode distribution in the X-axis direction. The refractive index distribution $F_{nA}$ is symmetrical, so that the distribution $F_{mA}$ of the guided mode in the optical waveguide input portion at section 4B1—4B1 is symmetrical. However, the refractive index distribution in the modulation area is asymmetrical, so that the distribution of the guided mode is also asymmetrical. In the optical waveguide at section 4B2—4B2, the refractive index on the left of the optical waveguide is increased by Δn of Formula 1, and the refractive index on the right of the optical waveguide is reduced by Δn of Formula 1. That is, a difference in refractive index between the right and the left can be doubled using the domain-inversion structure, to thereby half the voltage required for asymmetry. Thus, the guided mode is deflected to the left. In the optical waveguide at section 4C1—4C1, the refractive index on the left of the optical waveguide is reduced by Δn and the refractive index on the right is increased by Δn, by the applied electric field. Thus, the guided mode is deflected to the right.

Figure 4D:
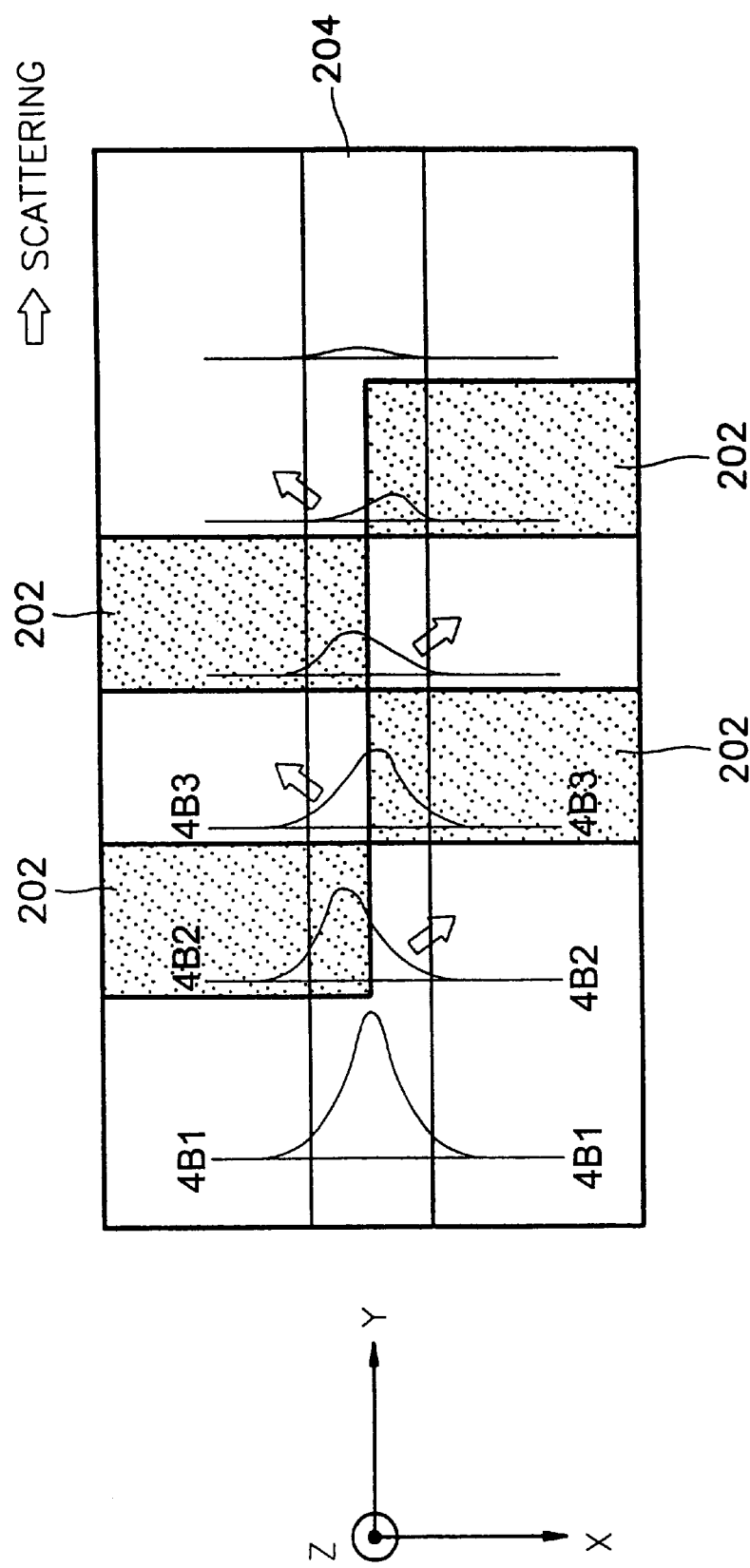
FIG. 4D shows the process of scattering of light in an optical waveguide when an electric field is o the optical modulator of FIG. 2.

The guided mode $F_{mB}$ at section 4B2—4B2, deflected to the left, enters section 4B3—4B3 in which the domain-inversion area is reversed, and is deflected to the right ($F_{mC}$), so that the guided mode is partially scattered into the substrate, greatly reducing the light intensity after passing through the modulation area. FIG. 4D shows the step of scattering the guided mode while a deflection direction of the guided mode is repeatedly changed to the right and left. The scattering step is the same as in the case in which an electric field in the −Z direction is applied to the optical waveguide. Thus, no additional inverter is required even when an optical signal is obtained by applying an inverted digital electric signal to the optical modulator.

With reference to the embodiment in which the integrated optical intensity modulator using a Z-cut crystal substrate is described according to the present invention, a S multitude of transition areas are formed in a staggered pattern around an optical waveguide, to thereby reduce the driving voltage. In the description above, a Z-cut substrate was used. However, an X-cut or Y-cut substrate may equally well be used.

According to the optical intensity modulator of the present invention, a driving voltage of the optical waveguide can be halved by deflection of the optical guided mode due to the staggered domain-inversion structure of a ferroelectric substrate, staggered around the optical waveguide. An area for deflecting an optical guide mode to the light or left is formed in multiple stages, to thereby increase an extinction ratio. Also, the electrode structure is simple, so that an broad band electrode can be simply designed. The above operation principle can be adopted by the optical waveguide having a high refractive index, so that the optical waveguide of the optical intensity modulator has good guiding conditions, to thereby reduce the insertion loss. The structure and the process of fabrication are simple. A symmetrical characteristic curve can be realized, to thereby require no additional inverter even for an inverted digital electric signal. Since the optical modulator uses a $LiNbO_3$ or $LiTaO_3$ substrate, it can be made using well-known fabrication and domain invention processes.

What is claimed is:

1. An integrated optical intensity modulator comprising:
   a substrate having a spontaneous polarization in a spontaneous polarization direction relative to the substrate, the substrate extending in a direction transverse to the spontaneous polarization direction along a longitudinal axis;

an optical waveguide in the substrate at a surface of the substrate and extending substantially parallel to and on the longitudinal axis;

a plurality of domain-inversion regions in the substrate having domains with a polarization in a direction reverse to the spontaneous polarization direction of the substrate, the domain-inversion regions being transverse to, extending to but not crossing the longitudinal axis, and arranged in a staggered pattern relative to the optical waveguide so that, along each side of the longitudinal axis and on opposite sides of the longitudinal axis, domain-inversion regions alternate with regions having a polarization in the spontaneous polarization direction; and a first electrode on the optical waveguide and second and third electrodes on the surface of the substrate, spaced from and on opposite sides of the optical waveguide, wherein when a voltage is applied to the first electrode relative to the second and third electrodes, a light wave propagating in the waveguide is deflected and scattered in the domain-inversion regions in accordance with changes of refractive index of the domain-inversion regions opposite the optical waveguide in response to the voltage relative to the refractive index of the spontaneous polarization regions opposite the optical waveguide.

2. The optical intensity modulator of claim 1, wherein the substrate is $LiNbO_3$.

3. The optical intensity modulator of claim 1, wherein the substrate is $LiTaO_3$.

4. The optical intensity modulator of claim 1, including a buffer layer for suppressing ohmic loss disposed between the optical waveguide and the first electrode.

5. The optical intensity modulator of claim 1 including an even number of the domain-inversion regions.

6. The optical intensity modulator of claim 1 wherein each of the second and third electrodes has substantially the same length along the longitudinal axis as the first electrode and each of the second and third electrodes is disposed opposite parts of n domain-inversion regions, where n is an integer, and the first electrode is disposed opposite parts of 2n domain-inversion regions.

7. A method for fabricating an integrated optical intensity modulator comprising:
   (a) forming a domain-inversion electrode on a surface of an electro-optical substrate, the domain-inversion electrode covering only regions of the substrate transverse to, extending to but not crossing a longitudinal axis of the substrate, and arranged in a staggered pattern relative to the longitudinal axis so that, on each side of the longitudinal axis and on opposite sides of the longitudinal axis, areas covered by the domain-inversion electrode alternate with areas not covered by the domain-inversion electrode;

(b) applying a voltage pulse to the domain-inversion electrode to form domain-invention regions in the substrate opposite the domain-inversion electrode, and removing the domain-inversion electrode;

(c) masking a portion of the substrate, including portions of the domain-inversion regions, leaving a portion of the surface of the substrate along and including the longitudinal axis exposed for formation of an optical waveguide, dipping the substrate into a proton source solution to exchange protons of the proton source solution with ions on the substrate, thereby forming a proton exchange area where the substrate is not masked, and unmasking the substrate;

(d) annealing the substrate to form an optical waveguide in the substrate at the proton exchange area, extending along and on the longitudinal axis; and (e) forming on the surface of the substrate a first electrode on the optical waveguide and additional electrodes, spaced from and on opposite sides of the optical waveguide.

8. The method of claim 7, including dipping in a proton source solution of benzoic acid.

9. The method of claim 7, including depositing an oxide layer on the proton exchange area before forming the first and other electrodes.

10. The method of claim 7, wherein masking a portion of the substrate includes forming a mask by depositing a Cr thin film.

11. The method of claim 7, including forming the domain-inversion electrode and the first electrode sequentially depositing Cr and Au.

* * * * *